United States Patent [19]

Lockwood

[11] Patent Number: 5,168,472
[45] Date of Patent: Dec. 1, 1992

[54] DUAL-FREQUENCY RECEIVING ARRAY USING RANDOMIZED ELEMENT POSITIONS

[75] Inventor: James C. Lockwood, San Diego, Calif.

[73] Assignee: The United States of America as represented by the Secretary of the Navy, Washington, D.C.

[21] Appl. No.: 791,802

[22] Filed: Nov. 13, 1991

[51] Int. Cl.$^5$ .............................................. G01S 3/80
[52] U.S. Cl. .................................. 367/119; 367/103; 367/135; 367/905
[58] Field of Search ................. 367/12, 103, 119, 138, 367/135, 905; 342/379, 368

[56] References Cited

U.S. PATENT DOCUMENTS

| | | |
|---|---|---|
| 4,064,479 | 12/1977 | Ruehle . |
| 4,143,351 | 3/1979 | Orieux . |
| 4,460,987 | 7/1984 | Stokes et al. ................. 367/103 |
| 4,509,151 | 4/1985 | Anderson ..................... 367/118 |
| 4,567,766 | 2/1986 | Seiferling ..................... 367/122 |
| 4,882,714 | 11/1989 | Tanigawa ..................... 367/103 |

OTHER PUBLICATIONS

Lockwood, "Randomized Arrays", J. Acoust Soc. Am 81(4), Apr. 1987, pp. 1009–1013.

Primary Examiner—Daniel T. Pihulic
Attorney, Agent, or Firm—Harvey Fendelman; Thomas Glenn Keough

[57] ABSTRACT

An array for receiving wave energy at a pair of widely spaced frequencies has receiving elements arranged to function as a half-wave array for the lower frequency and as a random array for the higher frequency. A plurality of receiving elements are arranged in an array with the receiving elements having nominal positions spaced apart such that spacing between adjacent nominal positions is approximately one half the wavelength $\lambda$ of the wave having the lower frequency. The receiving elements are randomly distributed about their respective nominal positions with each receiving element being within a distance of $\epsilon \lambda_o$ of its corresponding nominal position where $\epsilon$ is a randomization parameter and $\lambda_o$ is the wavelength of the higher frequency wave.

7 Claims, 1 Drawing Sheet

DUAL-FREQUENCY RECEIVING ARRAY USING RANDOMIZED ELEMENT POSITIONS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates generally to an array for receiving wave energy and particularly to an array for providing nearly optimum performance at a given low frequency while supporting operation at much higher frequencies.

Systems containing arrays of transducers such as linear or planar arrays used in underwater sonar systems are well-known. Conventional sonar systems are hampered by having narrow frequency bandwidths.

The fundamental difficulty in designing an array that must function at two widely-spaced frequencies is that an array with the customary element spacing of approximately one half wavelength designed for the higher frequency would have very low array gain at the lower frequency. A conventional low-frequency design would be aliased at the higher frequency. When an array is aliased, it is impossible to determine from which of several directions signals are arriving. The usual approach to the problem of designing an array that must have widely-spaced operating frequencies is to dedicate a subset of the array elements to each frequency, which is, in effect, providing separate arrays.

SUMMARY OF THE INVENTION

The present invention provides an apparatus and a method for forming an array for receiving wave energy at a pair of widely-spaced frequencies. An array according to the present invention functions as a half-wave array for the lower frequency and as a random array for the higher frequency.

A method according to the present invention provides an array for receiving wave energy having a first frequency $f_o$ and a corresponding first wavelength $\lambda_o$. The array also receives wave energy having a second frequency $f$ lower than the first frequency $f_o$ and a corresponding second wavelength $\lambda$, which is greater than the first wavelength $\lambda_o$. The method of the invention comprises the steps of arranging a plurality of receiving elements in an array with the receiving elements having nominal positions spaced apart such that the spacing between adjacent nominal positions is approximately one half the wavelength $\lambda$ of the wave having the second frequency $f$. The method further includes the steps of defining a randomization parameter $\epsilon$ as a fraction of the second wavelength $\lambda$ of the wave having the second frequency $f$ and randomly distributing the receiving elements about their respective nominal positions with each receiving element being within a distance of $\epsilon\lambda_o$ of its corresponding nominal position.

The receiving elements may be formed as either electromagnetic or sonic wave sensors.

As used herein, the terms periodic array, deterministic array, random array, and randomized array are defined as follows:

Periodic array—an array of sensors that sample an aperture at a constant interelement spacing (periodic sampling); see, for example, B. D. Steinberg, *Principles of Aperture and Array System Design*, John Wiley & Sons, New York, (1976), p. 73.

Deterministic Array—an array of sensors defined positionally according to a predesignated algorithm; see Steinberg p. 124.

Random Array—an array of sensors defined positionally according to a predesignated random process; see Steinberg p. 139.

Randomized Array—an array of sensors defined positionally as the sum of two components, the first defined according to a predesignated algorithm and the second defined according to a predesignated random process.

The apparatus according to the present invention comprises means for forming a periodic array or the second frequency, the periodic array having a plurality of receiving elements arranged to have a nominal spacing between adjacent receiving elements being approximately half the wavelength $\lambda$ and means for forming a randomized array of the plurality of receiving elements for the first frequency.

An appreciation of other aims and objectives of the present invention and a more complete understanding of this invention may be had by studying the following description of the preferred embodiment and by referring to the accompanying drawings.

DESCRIPTION OF THE PREFERRED EMBODIMENT

The presented embodiment described in the following paragraphs is representative of a sonar application of the present invention. The principles of the invention apply also to arrays for electromagnetic energy. Therefore, the described embodiment should be regarded as exemplary rather than as limiting.

Figure 1:
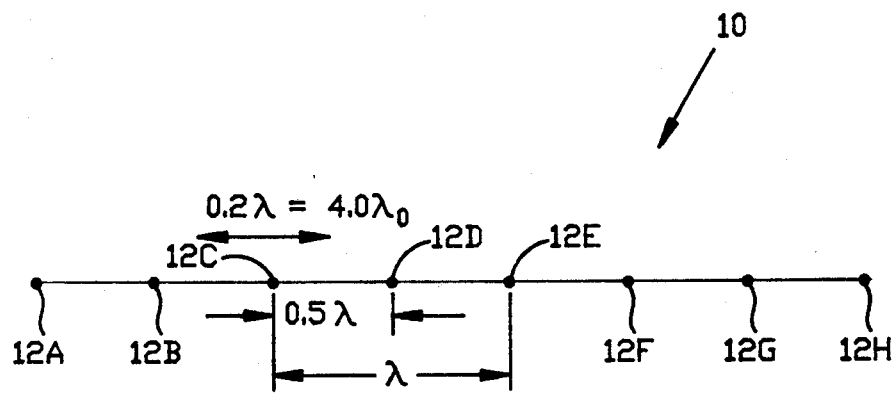
FIG. 1 illustrates a line array formed in a randomized configuration according to the present invention.

FIG. 1 schematically illustrates an example of a dual frequency randomized line array 10 according to the present invention. The line array 10 is a special case of randomized arrays. The array 10 includes a plurality of sensing element 12A, 12B, etc. In a sonar application of the invention, each sensing element may be a conventional sonic sensor for underwater use. Various hydrophone and electroacoustical transducers may be used in practicing the invention.

The statistical properties of the entire class of randomized arrays are described in a paper authored by the present inventor, J. C. Lockwood, "Randomized Arrays," *J. Acoust. Soc. Am* 81 (4), Apr. 1987, which is hereby incorporated by reference into the present disclosure.

The randomized array 10 is formed by starting with a completely deterministic, periodic array for the lower frequency and then randomizing the position of each element about its predetermined design position to provide a randomized array for the higher frequency. A randomization parameter $\epsilon$ is defined to represent the maximum distance in wavelengths at the low frequency from the design position at which an element can be located. Within the distance $\epsilon$ from the design position the position of each element is chosen at random in accordance with a probability density function.

A uniform probability density function may be used to design the array 10. By varying the randomization parameter ε between zero and the full array size, one can produce arrays ranging from completely deterministic to totally random. For intermediate values of the randomization parameter ε it has been found that arrays appear to be totally random except in a region near the main lobe where the pattern is nearly characteristic of a deterministic array.

The lower the frequency, the wider the region of deterministic character. This accounts for the ability to design a single array that appears random at high frequencies and deterministic at low frequencies.

To ensure that the array behaves approximately like a periodic array at the low frequency f, ε is chosen such that the most random point on the beam pattern has its local amplitude variance less than that of a random array having the same number of sensors. That condition implies that ε must be less than 0.25.

To ensure that the array is approximately random at the high frequency $f_o$, ε must also be chosen such that the local amplitude variance at the worst-case nominal grating lobe is at least 0.9 times the variance of a random array having the same number of elements. That condition implies that ε is greater than or equal to d/2.7 where d is the nominal element spacing in wavelengths at the low frequency. Hence the randomization parameter ε must be greater than or equal to d/2.7 and less than 0.25.

The array 10 illustrates the principles of the invention for use at two frequencies $f_o$ and f when the higher frequency $f_o$ is a factor of 20 higher than the lower frequency f. The wavelength $\lambda_o$ corresponding to the higher frequency $f_o$ is 1/20 of the wavelength λ for the lower frequency f. The array 10 illustrated in FIG. 1 has eight receiving elements.

The positions of the array elements are determined by first defining equal half wavelength spacings at the lower frequency f. The spacing between adjacent elements is 0.5 λ for the lower frequency $f=f_o/20$. The wavelength for the higher frequency is 1/20 of the wavelength for the lower frequency. Therefore, for the higher frequency the spacing between adjacent elements is $10\lambda_o$.

These spacings are referred to as the nominal positions. Then an interval of ±ελ centered on each of the nominal positions is defined, and the final element positions are chosen at random based upon a uniform probability distribution on each respective interval. In the illustrated array, the randomization parameter ε=0.2, so the maximum deviation from the nominal position is 4.0 times the shorter wavelength $\lambda_o$, which is 0.2 times the longer wavelength λ.

Figure 2:
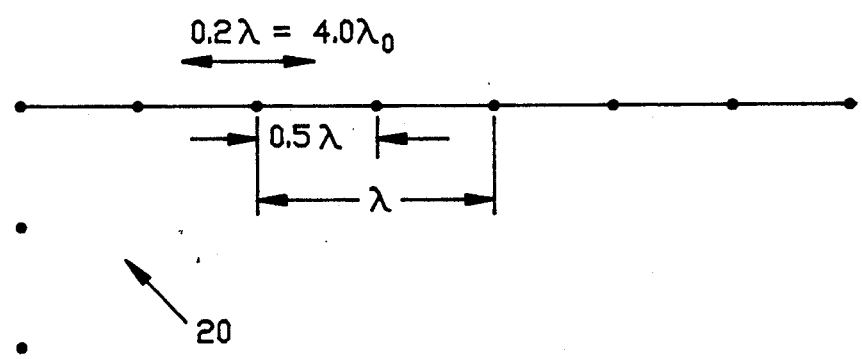
FIG. 2 illustrates a two-dimensional array formed in a randomized configuration according to the present invention.
Figure 2:
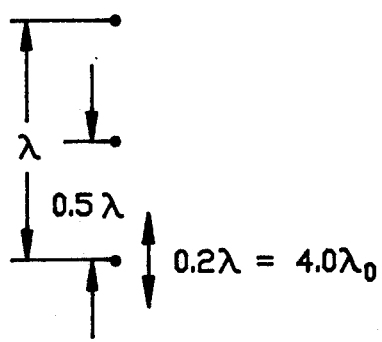

FIG. 2 illustrates a two-dimensional array 20, which is formed of a pair of arrays like the array 10 arranged perpendicular to one another. A two-dimensional array can eliminate right-left ambiguities that occur at the higher frequency for line arrays.

Randomization of 0.2λ at the low frequency, given the frequency ratio of 20, results in randomization at the high frequency of ±4.0$\lambda_o$, which makes the array essentially random. The randomized array has an average array gain of approximately 10 log (N) and a very narrow main beamwidth, which is approximately the inverse of the array length expressed in wavelengths.

The use of a randomized array permits design of an array in which all elements can be used to receive at two widely different frequencies with full 10 log (N) directivity gain at each frequency. The randomized array is amenable to adaptive beamforming and has the advantage over an undersampled periodic array in that the complete ambiguities associated with aliasing do not occur. When beamformed in a conventional manner, the randomized array tends to average the noise from all directions, making the interference background at the beamformer output nearly uniform.

It is noted that once the dual-frequency array is designed as described above for a specific low frequency, the desired randomization is achieved at any higher frequency. Hence the higher frequency operation of the array can actually be broadband.

The structures and methods disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. A method for receiving wave energy having a first frequency $f_o$ and a corresponding first wavelength $\lambda_o$ and having a second frequency f lower than the first frequency $f_o$ and a corresponding second wavelength λ, comprising the steps of:

arranging a plurality of receiving elements in an array with the receiving elements having nominal positions spaced apart by a distance d such that spacing between adjacent nominal positions is approximately one half the wavelength λ of the wave having the second frequency f;

defining a randomization parameter ε as a fraction of the wavelength λ of the wave having the second frequency f;

randomly distributing the receiving elements about their respective nominal positions with each receiving element being within a distance of ελ of its corresponding nominal position; and receiving said wave energy having said first frequency f₀ and said second frequency f.

2. The method of claim 1 including the step of forming the receiving elements as sonic wave sensors.

3. The method of claim 1 including the step of forming the receiving elements as electromagnetic wave sensors.

4. The method of claim 1 including the step of selecting the randomization parameter ε to be greater than or equal to d/2.7 and less than 0.25.

5. An apparatus for receiving wave energy comprised of a first frequency $f_o$ and a corresponding first wavelength $\lambda_o$ and a second frequency f lower than the first frequency $f_o$ and a corresponding second wavelength λ, comprising a plurality of receiving elements arranged in an array with the receiving elements having nominal positions spaced apart by a distance d such that spacing between adjacent nominal positions is approximately one half the wavelength λ of the wave having the second frequency f, the receiving elements being randomly distributed about their respective nominal positions with each element being within a distance of ελ of its corresponding nominal position where ε is a randomization parameter expressed as a fraction of the wavelength λ and where ε is greater than or equal to d/2.7 and less than 0.25.

6. The apparatus of claim 5 wherein the receiving elements are sonic wave sensors.

7. The apparatus of claim 5 wherein the receiving elements are electromagnetic wave sensors.

* * * * *